(12) United States Patent
Araki et al.

(10) Patent No.: US 11,334,353 B2
(45) Date of Patent: May 17, 2022

(54) MULTIPARTY COMPUTATION METHOD, APPARATUS AND PROGRAM

(71) Applicants: NEC CORPORATION, Tokyo (JP); BAR-ILAN UNIVERSITY, Ramat Gan (IL)

(72) Inventors: Toshinori Araki, Tokyo (JP); Kazuma Ohara, Tokyo (JP); Jun Furukawa, Tokyo (JP); Lindell Yehuda, Ramat Gan (IL); Nof Ariel, Ramat Gan (IL)

(73) Assignees: NEC CORPORATION, Tokyo (JP); BAR-ILAN UNIVERSITY, Ramat Gan (IL)

( * ) Notice: Subject to any disclaimer, the term of this patent is extended or adjusted under 35 U.S.C. 154(b) by 242 days.

(21) Appl. No.: 16/614,190

(22) PCT Filed: May 18, 2017

(86) PCT No.: PCT/JP2017/018747
§ 371 (c)(1),
(2) Date: Nov. 15, 2019

(87) PCT Pub. No.: WO2018/211676
PCT Pub. Date: Nov. 22, 2018

(65) Prior Publication Data
US 2021/0334099 A1   Oct. 28, 2021

(51) Int. Cl.
*G06F 9/30* (2018.01)
*G06F 7/523* (2006.01)
(Continued)

(52) U.S. Cl.
CPC ............ *G06F 9/3001* (2013.01); *G06F 7/523* (2013.01); *G06F 7/78* (2013.01); *G06F 9/544* (2013.01)

(58) Field of Classification Search
CPC .......... G06F 9/3001; G06F 7/78; G06F 7/523; G06F 9/544; H04L 2209/46; H04L 9/085
See application file for complete search history.

(56) References Cited

U.S. PATENT DOCUMENTS

| 6,772,339 B1 | 8/2004 | Jakobsson et al. |
| 7,055,170 B1 * | 5/2006 | Karmouch .......... H04L 63/0428 726/14 |

(Continued)

FOREIGN PATENT DOCUMENTS

| JP | 2000-228060 A | 8/2000 |
| JP | 2012-078446 A | 4/2012 |

(Continued)

OTHER PUBLICATIONS

Tal Rabin et al., "Verifiable Secret Sharing and Multiparty Protocols with Honest Majority", STOC, 1989, pp. 73-85.
(Continued)

*Primary Examiner* — Farley Abad
(74) *Attorney, Agent, or Firm* — Sughrue Mion, PLLC

(57) ABSTRACT

A method for multiparty computation wherein a plurality of parties each compute a preset function without revealing inputs thereof to others, comprises: each of the parties performing a validation step to validate that computation of the function is carried out correctly, wherein the validation step includes: a first step that prepares a plurality of verified multiplication triples and feeds a multiplication triple to a second step when required; and the second step that consumes a randomly selected multiplication triple generated by the first step, wherein the first step performs shuffling of the generated multiplication triples, in at least one of shuffle in a sequence and shuffle of sequences.

9 Claims, 13 Drawing Sheets

(51) Int. Cl.
*G06F 7/78* (2006.01)
*G06F 9/54* (2006.01)

(56) References Cited

U.S. PATENT DOCUMENTS

| | | | |
|---|---|---|---|
| 10,002,547 B2 | 6/2018 | Ikarashi et al. | |
| 2004/0153661 A1* | 8/2004 | Graunke | G06F 21/14 |
| | | | 713/194 |
| 2005/0028009 A1* | 2/2005 | Neff | H04L 9/3252 |
| | | | 726/4 |
| 2011/0040761 A1* | 2/2011 | Flatland | G06F 16/319 |
| | | | 707/737 |
| 2012/0002811 A1 | 1/2012 | Smart | |
| 2012/0079602 A1* | 3/2012 | Kolesnikov | H04L 9/0662 |
| | | | 726/26 |
| 2016/0335924 A1 | 11/2016 | Ikarashi et al. | |
| 2017/0353302 A1* | 12/2017 | Fernandez | G06F 21/6254 |
| 2017/0365192 A1 | 12/2017 | Ikarashi | |
| 2018/0115415 A1 | 4/2018 | Teranishi | |

FOREIGN PATENT DOCUMENTS

| | | |
|---|---|---|
| JP | 2013-142927 A | 7/2013 |
| JP | 2016-126354 A | 7/2016 |
| WO | 2013/001021 A1 | 1/2013 |
| WO | WO 2015/107952 A1 | 7/2015 |
| WO | 2016/159357 A1 | 10/2016 |

OTHER PUBLICATIONS

Oded Goldreich et al., "How to Solve and Protocol Problem—An Efficiency Improvement", Advanced in Cryptology—Crypto, 1987, LNCS 293, pp. 73-86.

Ivan Damgard et al., "Multiparty Computation from Somewhat Homomorphic Encryption", CRYPTO, 2012, LNCS 7417, pp. 643-662.

Toshinori Araki et al., "High-Throughput Semi-Honest Secure Three-Party Computation with an Honest Majority", CCS'16 Proceedings of the 2016 ACM SIGSAC Conference on Computer and Communications Security, 2016, pp. 805-817.

Jun Furukawa et al., "High-Throughput Secure Three-Party Computation for Malicious Adversaries and an Honest Majority", Cryptology ePrint Archive (online), Feb. 8, 2017, pp. 1-36, <URL:http://eprint.iacr.org/2016/944>.

International Search Report for PCT/JP2017/018747 dated Aug. 15, 2017 (PCT/ISA/210).

Written Opinion of the International Searching Authority for PCT/JP2017/018747 dated, Aug. 15, 2017 (PCT/ISA/237).

* cited by examiner

[Fig. 1A]
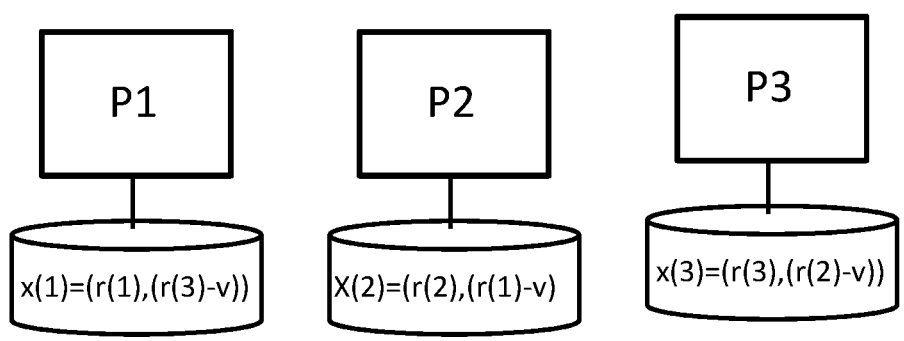
Secret Sharing of v
r(1), r(2) and r(3) are randomly selected in Ring where r(1)+r(2) + r(3)=0

[Fig. 1B]
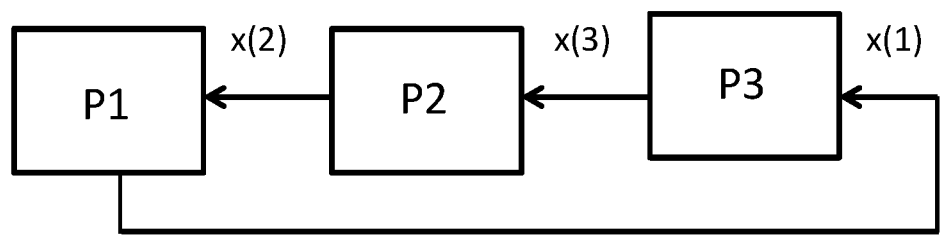
Reconstruct:
P1: given x(1) and x(2), computes v=r(1)-(r(1)-v)
P2: given x(2) and x(3), computes v=r(2)-(r(2)-v)
P3: given x(3) and x(1), computes v=r(3)-(r(3)-v)

[Fig. 2]
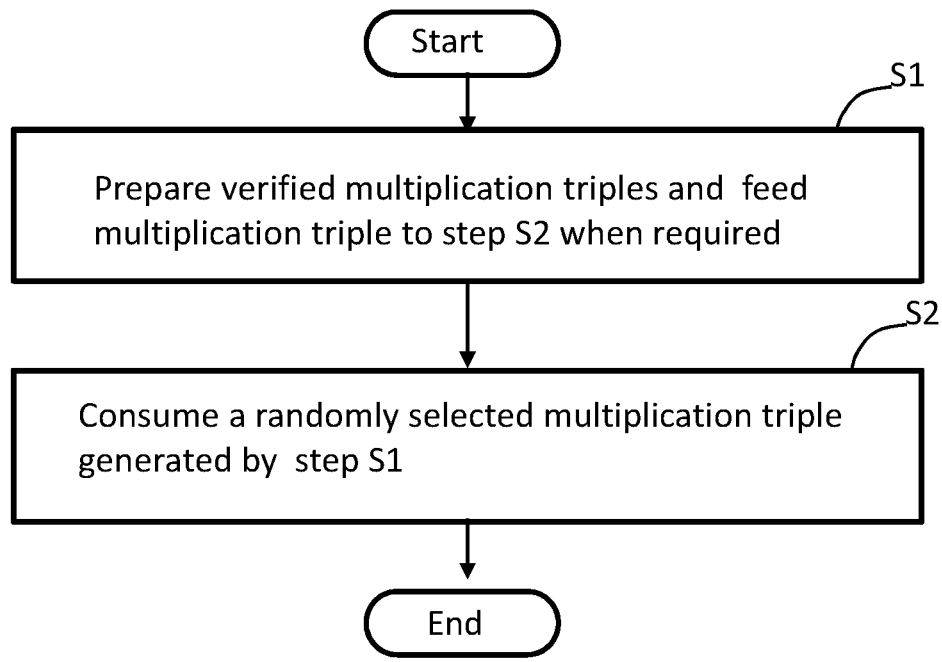

[Fig. 3]
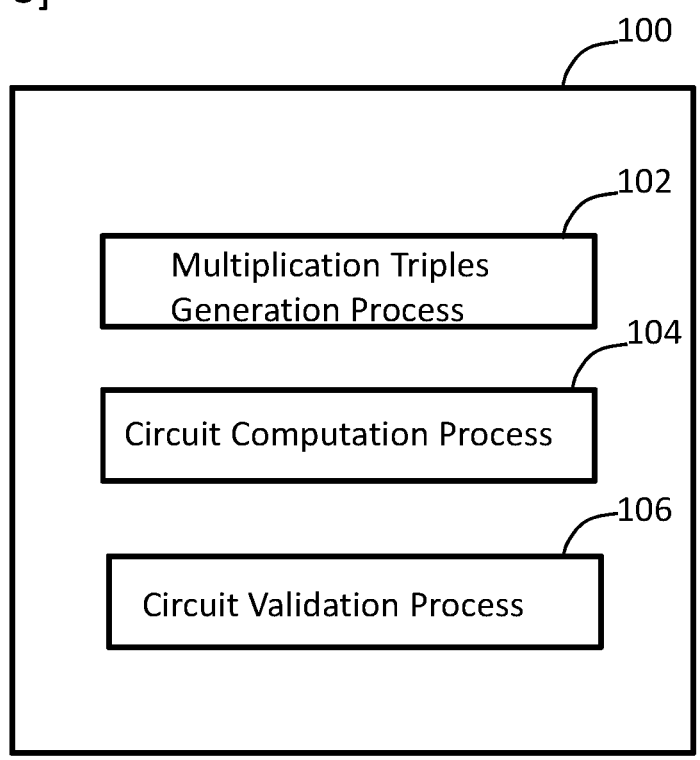

[Fig. 4]
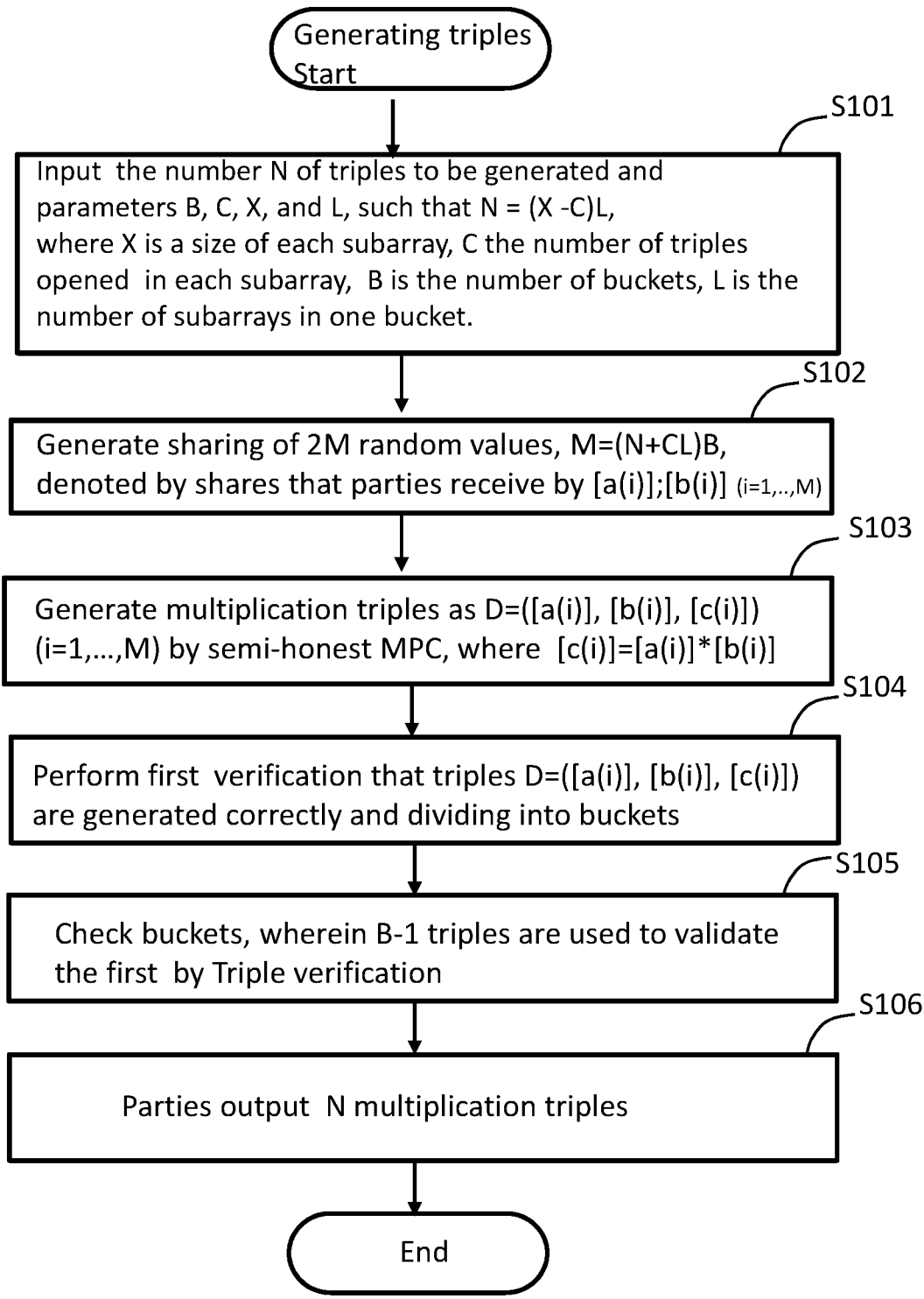

D'(1)
The number of triples = $N=(X-C)*L$

D'(2)
The number of triples = $N+CL= X*L$

⋮

D'(B)
The number of triples = $N+CL= X*L$

[Fig. 6]
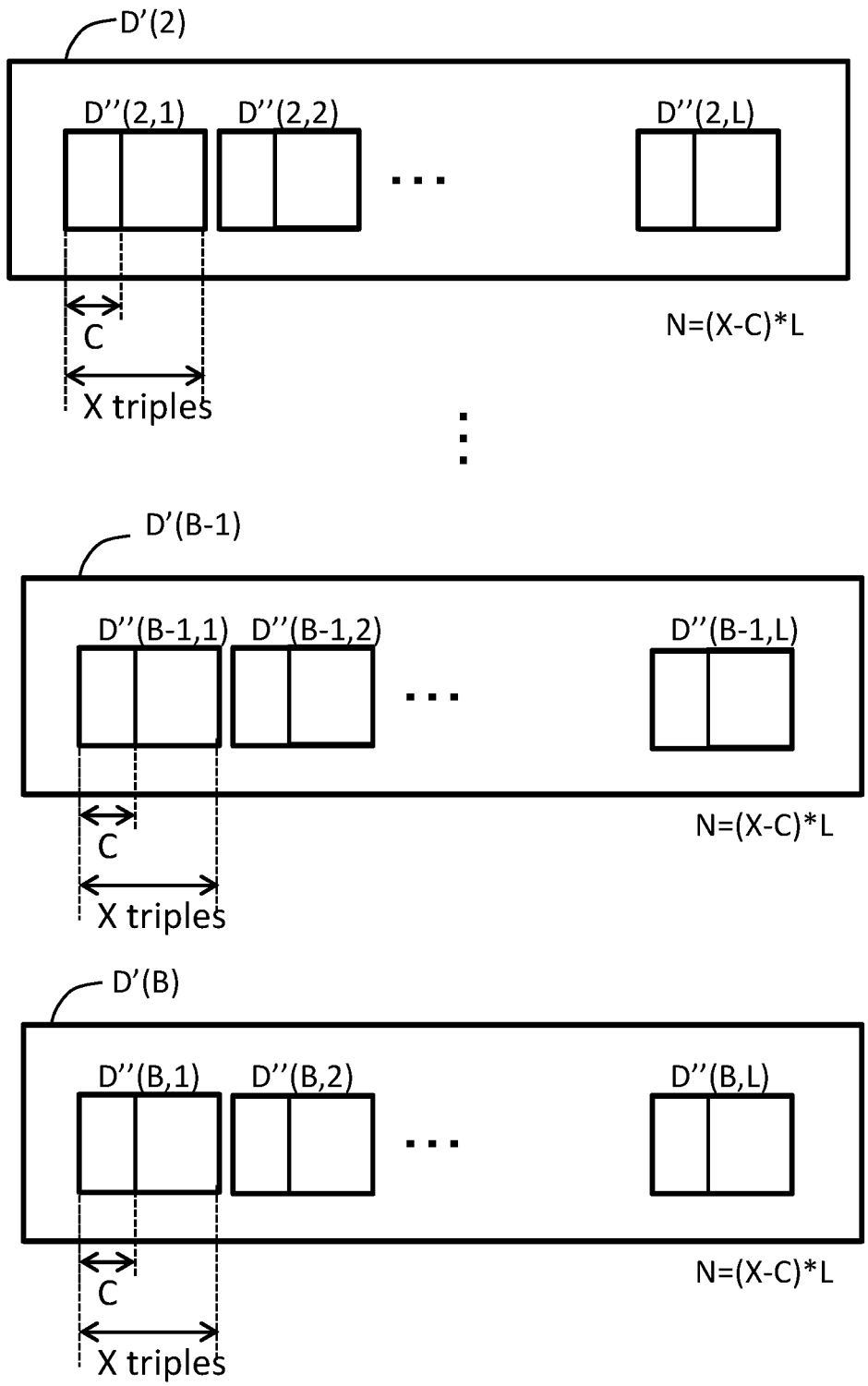

[Fig. 7]
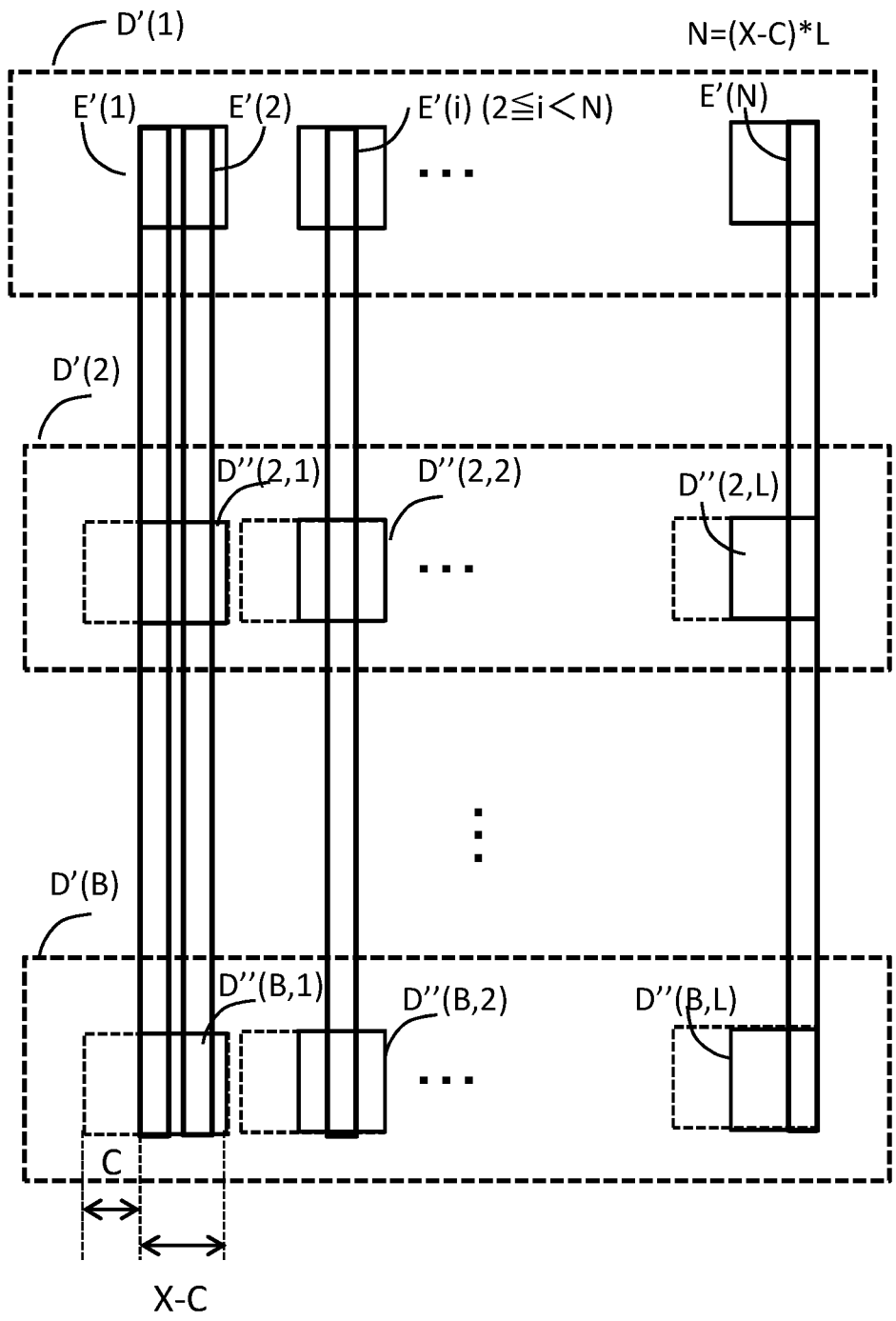
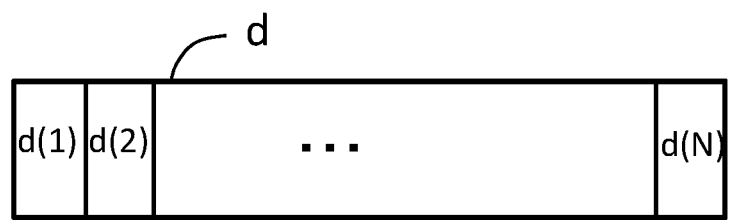

[Fig. 8]
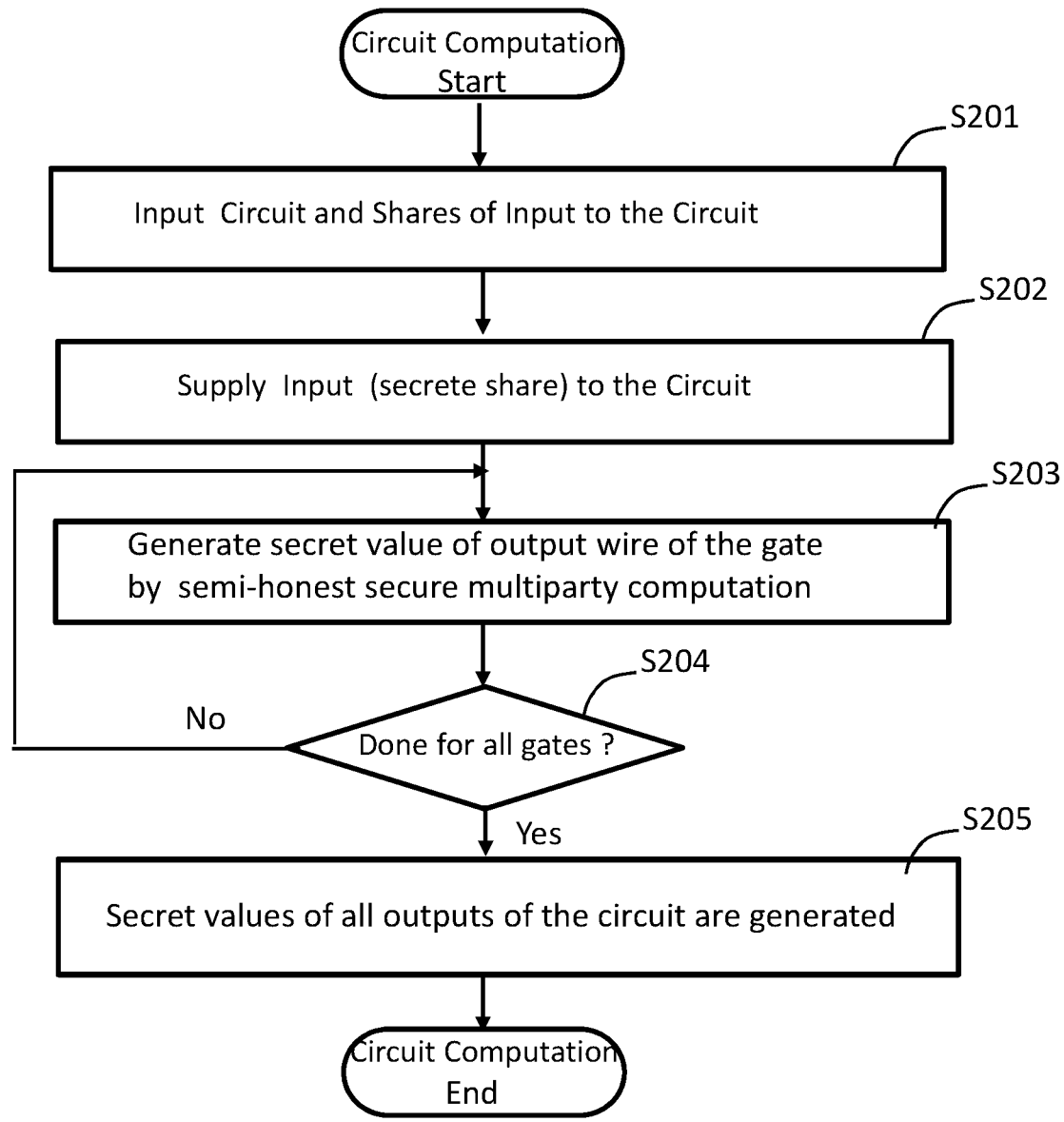

[Fig. 9]
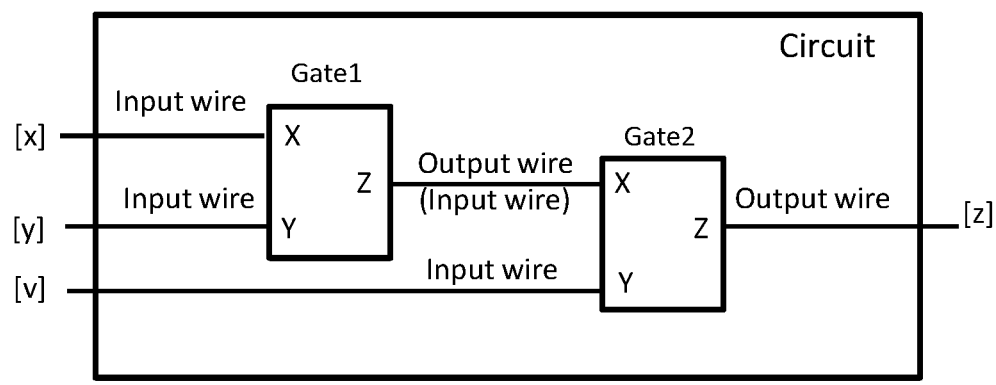

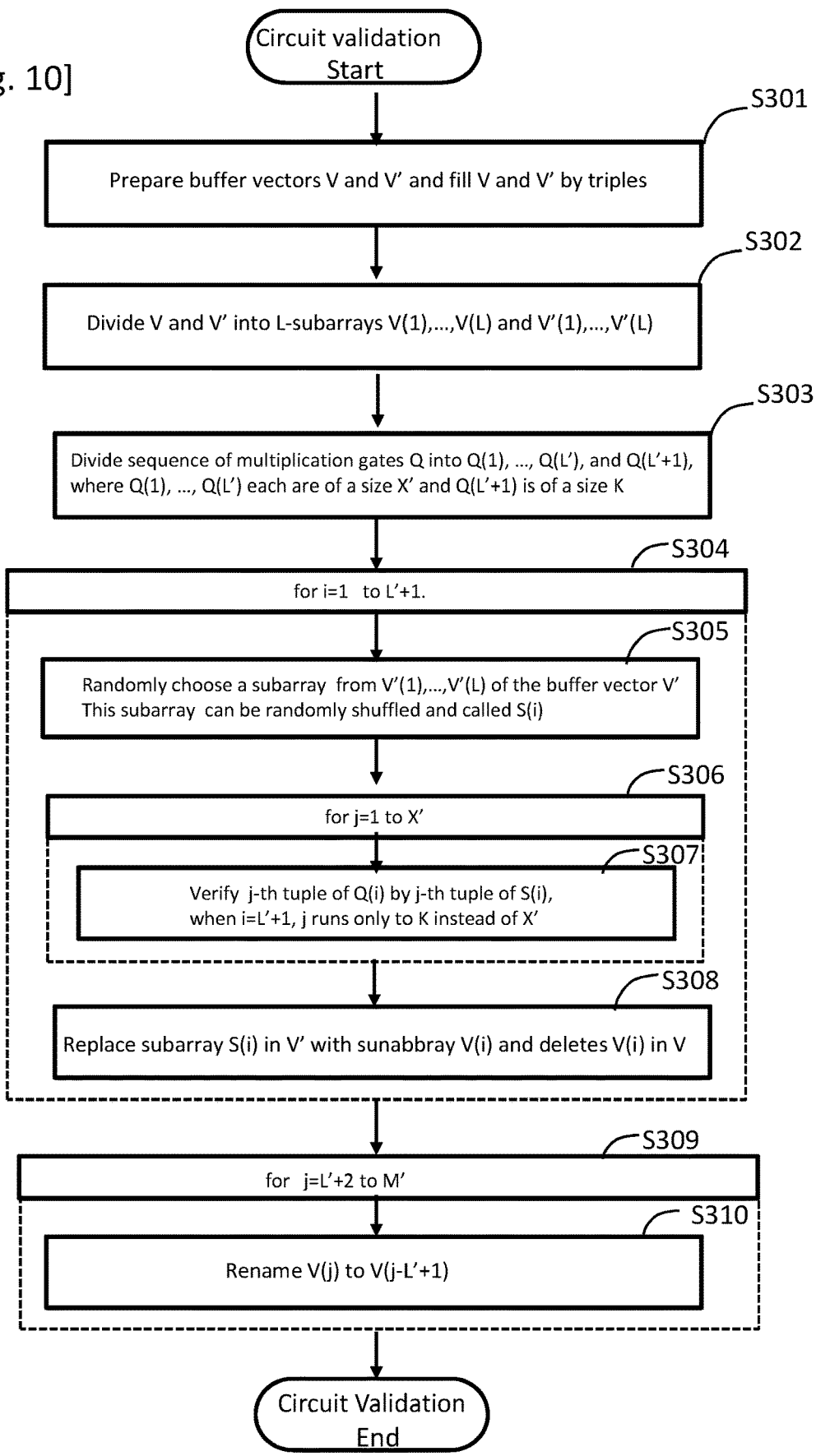
[Fig. 10]

[Fig. 11]
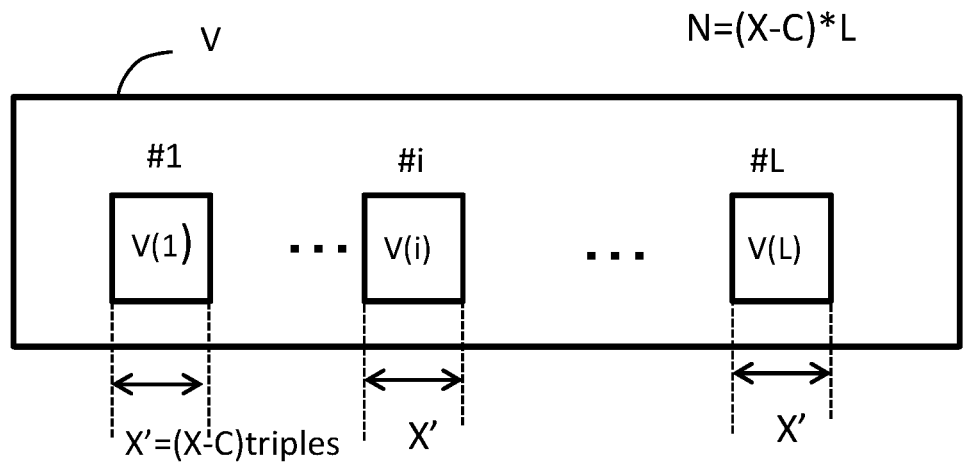
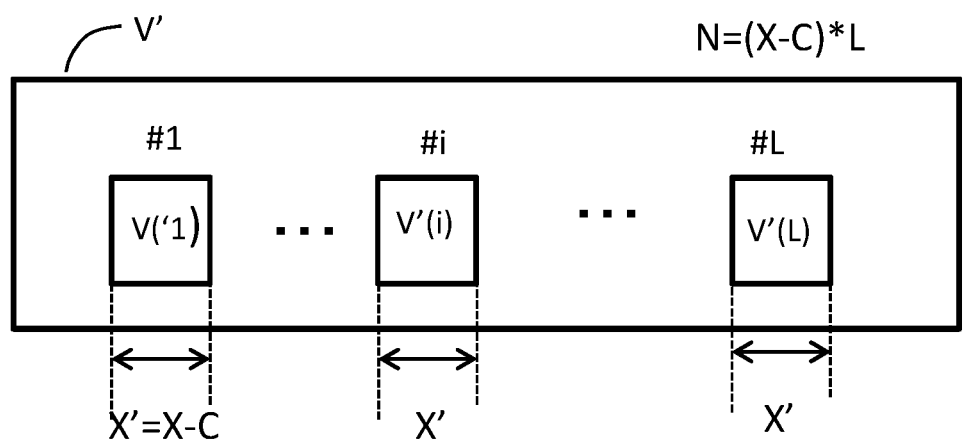
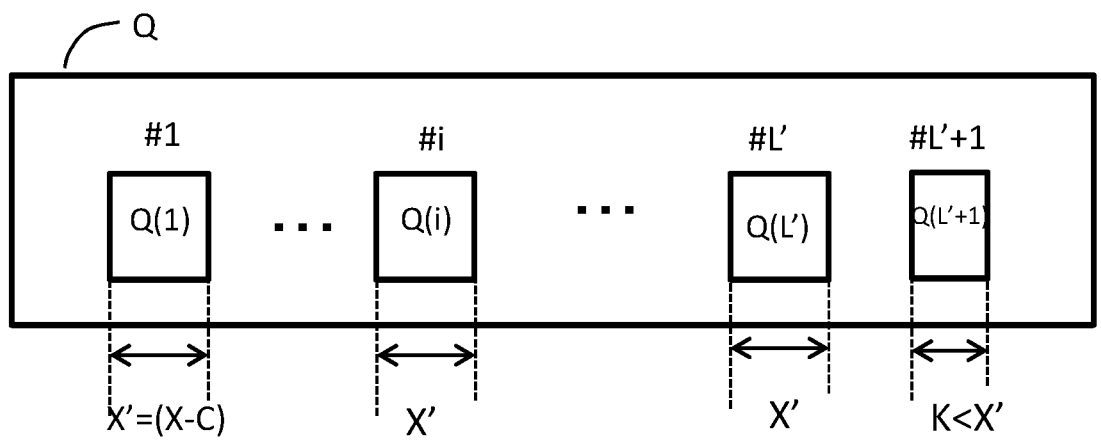

[Fig. 12]
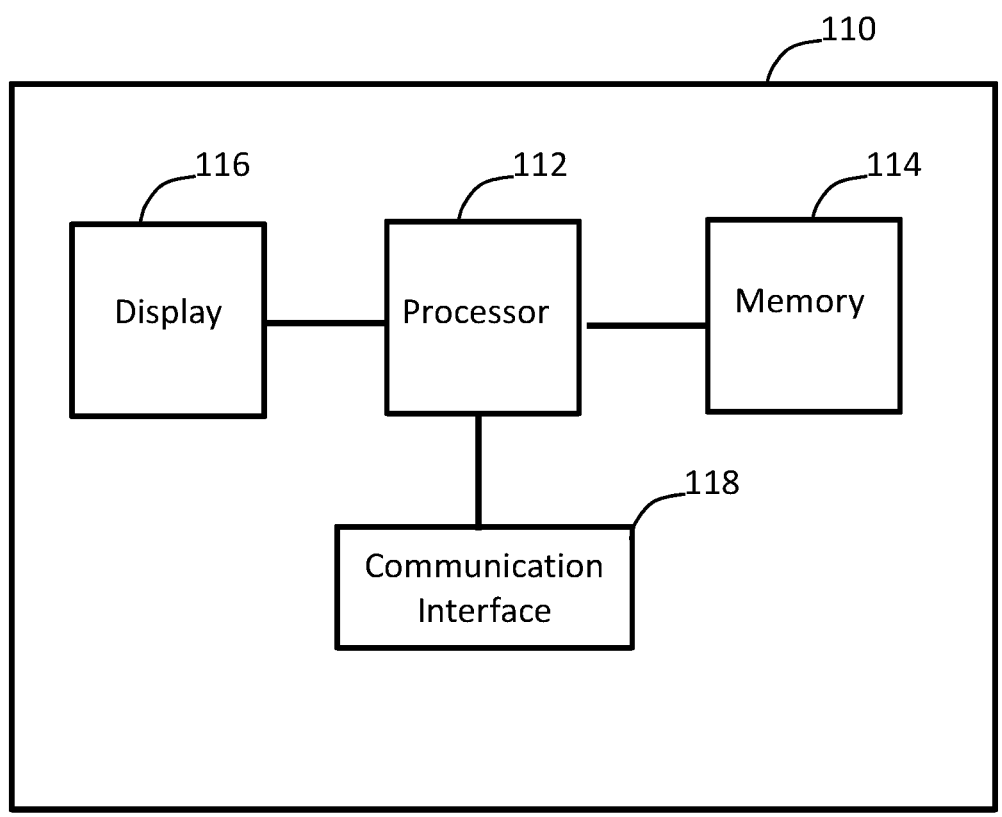

MULTIPARTY COMPUTATION METHOD, APPARATUS AND PROGRAM

FIELD

The present invention relates to a multiparty computation (MPC) method, apparatus and program.

BACKGROUND

In MPC, a given number of parties with respective private data are able to compute a function of the private data as an input without each revealing its input to others.

[NPL 1]
Tal Rabin, Michael Ben-Or, "Verifiable Secret Sharing and Multiparty Protocols with Honest Majority", (Extended Abstract). STOC 1989: 73-85

[NPL 2]
Oded Goldreich, Ronen Vainish, "How to Solve any Protocol Problem—An Efficiency Improvement", CRYPTO 1987: 73-86.

[NPL 3]
Ivan Damgaard, Valerio Pastro, Nigel P. Smart, Sarah Zakarias, "Multiparty Computation from Somewhat Homomorphic Encryption", CRYPTO 2012: 643-662.

[NPL 4]
Toshinori Araki, Jun Furukawa, Yehuda Lindell, Ariel Nof and Kazuma Ohara, "High-Throughput Semi-Honest Secure Three-Party Computation with an Honest Majority", CCS '16 Proceedings of the 2016 ACM SIGSAC Conference on Computer and Communications Security, Pages 805-817

[NPL 5]
Jun Furukawa, Yehuda Lindell, Ariel Nof and Or Weinstein, "High-Throughput Secure Three-Party Computation for Malicious Adversaries and an Honest Majority", Advances in Cryptology—EUROCRYPT 2017. EUROCRYPT 2017. Lecture Notes in Computer Science, vol. 10211. Springer, Cham

SUMMARY

The related technologies such as NPLs 1 and 2 are secure only when all parties each follow a relevant protocol, but are not secure against parties who do not honestly follow the protocol. This means that all parties learn nothing from data received from the other parties as long as they honestly follow the protocol. Such a protocol is said to achieve semi-honest security.

The related technology disclosed in NPL3 is secure against parties who do not honestly follow the protocol, but requires heavy pre-computation.

Accordingly, it is an object of the present invention to provide a multiparty computation method, apparatus and program which does not require much pre-computation and secure against malicious adversary.

According to an aspect of the present invention, there is provided a method for multiparty computation wherein a plurality of parties each compute a preset function without revealing inputs thereof to others, the method comprising:

each of the parties performing a validation step to validate that computation of the function is carried out correctly, wherein the validation step includes:

a first step that prepares a plurality of verified multiplication triples and feeds at least a multiplication triple to a second step when required; and the second step that consumes a randomly selected multiplication triple generated by the first step, wherein the first step performs shuffling of the generated multiplication triples, in at least one of shuffle in a sequence and shuffle of sequences.

According to another aspect of the present invention, there is provided a method for multiparty computation wherein a plurality of parties each compute a preset function without revealing inputs thereof to others, the method comprising:

each of the parties performing a validation step to validate that computation of the function is carried out correctly, wherein the validation step includes:

a first step that prepares a plurality of verified multiplication triples and feeds at least a multiplication triple to a second step when required; and the second step that consumes a randomly selected multiplication triple generated by the first step;

wherein the first step uses a first buffer to provide a multiplication triple randomly selected from entirety thereof when required, and to be refilled from a second buffer in order.

According to an aspect of the present invention, there is provided a multiparty computation apparatus comprising a processor with a memory to execute a circuit validation process to validate that multiparty computation of a preset function is carried out correctly, wherein the circuit validation process includes: a first process that prepares a plurality of verified multiplication triples and feeds at least a multiplication triple to a second step when required; and the second process that consumes a randomly selected multiplication triple generated by the first process, wherein the first process performs shuffling of the generated multiplication triples, in at least one of shuffle in a sequence and shuffle of sequences.

According to another aspect of the present invention, there is provided a multiparty computation apparatus comprising a processor with a memory to execute a circuit validation process to validate that multiparty computation of a preset function is carried out correctly, wherein the circuit validation process includes: a first process that prepares a plurality of verified multiplication triples and feeds at least a multiplication triple to a second process when required; and the second process that consumes a randomly selected multiplication triple generated by the first process, wherein the first process includes a first buffer to provide a multiplication triple randomly selected from entirety thereof when required, and to be refilled from a second buffer in order.

According to an aspect of the present invention, there is provided a program causing a computer to execute circuit validation process to validate that multiparty computation of a preset function is carried out correctly, wherein the circuit validation process comprises: a first process that prepares a plurality of verified multiplication triples and feeds at least a multiplication triple to a second process when required; and the second process that consumes a randomly selected multiplication triple generated by the first process, wherein the first process performs shuffling of the generated multiplication triples, in at least one of shuffle in a sequence and shuffle of sequences.

According to another aspect of the present invention, there is provided a program causing a computer to execute circuit validation process to validate that multiparty computation of a preset function is carried out correctly, wherein the circuit validation process comprises: a first process that prepares a plurality of verified multiplication triples and feeds at least a multiplication triple to a second process when required; and the second process that consumes a randomly selected multiplication triple generated by the first process, wherein the first process uses a first buffer to provide a multiplication triple randomly selected from entirety thereof when required, and to be refilled from a second buffer in order.

According to another aspect of the present invention, there is provided a non-transitory computer readable recording medium storing the above program therein, such as a semiconductor memory such as random access memory (RAM), a read only memory (ROM), an electrically erasable programmable read-only memory (EEPROM), a universal serial bus (USB) device, and solid state drive (SSD), or a storage device such as a Hard Disk Drive (HDD), a Compact Disc (CD), or Digital Versatile Disc (DVD) and so forth.

According to the present invention, a multiparty computation that is secure against malicious adversary is enabled without requiring pre-computation.

Still other features and advantages of the present invention will become readily apparent to those skilled in this art from the following detailed description in conjunction with the accompanying drawings wherein only example embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1A is a diagram illustrating (2,3) secret sharing scheme.

FIG. 1B is a diagram illustrating (2,3) secret sharing scheme.

FIG. 2 is a flowchart illustrating an operation of a first example embodiment of the present invention.

FIG. 3 is a diagram illustrating an arrangement of the first example embodiment of the present invention.

FIG. 4 is a flow chart illustrating an operation for generating triples in the first example embodiment of the present invention.

FIG. 5 is a diagram schematically illustrating a memory arrangement for generating triples in the first example embodiment of the present invention.

FIG. 6 is a diagram schematically illustrating a memory arrangement for generating triples in the first example embodiment of the present invention.

FIG. 7 is a diagram schematically illustrating a memory arrangement for generating triples in the first example embodiment of the present invention.

FIG. 8 is a flow chart illustrating an operation for circuit computation in the first example embodiment of the present invention.

FIG. 9 is a diagram schematically illustrating circuit computation in the first example embodiment of the present invention.

FIG. 10 is a flow chart illustrating an operation for circuit validation in the first example embodiment of the present invention.

FIG. 11 is a diagram schematically illustrating a buffer arrangement for circuit validation in the first example embodiment of the present invention.

FIG. 12 is a diagram illustrating an arrangement of a second example embodiment of the present invention.

DETAILED DESCRIPTION

Example embodiments will be described with reference to drawings. In the following, the basics of the embodiments of the present invention will be outlined at first. A multiparty computation (MPC) protocol has a threshold requirement on an adversary. For example, in the case where the number of parties is n, and the number of parties corrupted by the adversary is t, The MPC protocol requires t<n=3 or t<n=2. Let n be the number of parties who participate in the MPC protocol. Let $P(1), \ldots,$ and $P(n)$ denote, respectively, these n parties.

Let R be a ring where addition and multiplication is defined. Ring may be the ring modulo $2^n$ (^ is an operator for power of 2) or arbitrary finite Fields. Everything holds for arbitrary finite Fields and Rings in which $3^{(-1)}$ exists.

Let SecretShare( ) be a function of (t,n)-secret sharing scheme that, given an element of R, outputs $x(1), \ldots, x(n)$ called shares.

These shares are such that satisfying the following:
(i) there exists a function Reconstruct( ) that outputs x if any set of t shares out of n shares is input thereto; and
(ii) from a set of any t−1 shares, it is computationally infeasible to reconstruct any part of x.

We say that x is secretly shared, if for each of i (=1, . . . , n), P(i) has x(i). This is denoted as [x]. That is, the notation [x] is used to denote that a value x is secretly shared among a plurality of parties such as P(1) to P(n).
<(2,3)-Secret Sharing Scheme>

The following describes an example of (2,3)-secret sharing. In order to share an element v mod $2^n$, a dealer chooses three random elements r(1), r(2) and r(3) under the following constraint:

$$r(1)+r(2)+r(3)=0.$$

P(1)'s share may be x(1)=(r(1), t(1)), where t(1)=r(3)−v,
P(2)'s share may be x(2)=(r(2), t(2)), where t(2)=r(1)−v, and
P(3)'s share may be x(3)=(r(3), t(3)), where t(3)=r(2)−v.
It is clear that no single party's share reveals anything about the secret v.

Regarding a function Reconstruct( ), given x(1)=(r(1), t(1)) and x(2)=(r(2), t(2)), for example, one (such as P(1)) can compute v=r(1)−t(2)=r(1)−(r(1)−v).

In the similar manner, P(2) can compute v from the pair of x(2) and x(3), i.e., v=r(2)−(r(2)−v) and P(3) can compute v from the pair of x(3) and x(1) i.e., v=r(3)−(r(3)−v). We denote by [v] a 2 out-of 3 sharing of the value v according to the above secret-sharing scheme.

It is noted that the secret v may be a bit, and r(1), r(2), and r(3) may be three random bits such that r(1), r(2), r(3)∈{0,1} under constraint: r(1)⊕r(2)⊕r(3)=0, where "+" in the circle indicates a bit-wise exclusive-OR. In this case, t(1)=r(3)⊕v, t(2)=r(1)⊕v, t(3)=r(2)⊕v (reference may be made to NPL 4).

We say that a set of parties opens [v], if all items of data necessary to reconstruct v are distributed in the shares of these parties, and all items of data are gathered to one of these parties, each of which can reconstruct v by using Reconstruct( ). A sub-procedure: "open([v])" may be defined as follows.

When the share of the secret v is denoted by {(r(1), t(i))} (i=1, ..., 3), each party P(i) sends t(i) to P(i+1), with P(4) being P(1), and each P(i) outputs v=r(i)−t(i−1) (or v=r(i)⊕t(i−1)), with t(0) being t(3).

Given [x] and [y], we assume that n parties P(1), ..., and P(n) are able to compute using MPC: [z]=[x+y], without any communication, with semi-honest security. This procedure is denoted by [z]=[x]+[y].

The following describes an example of MPC addition. Suppose x and y are secretly shared by the (2,3)-secret sharing scheme. More specifically,
P(1)'s share of x is (x(11), x(12)), where x(12)=x(31)−x;
P(2)'s share of x is (x(21), x(22)), where x(22)=x(11)−x; and
P(3)'s share of x is (x(31), x(32)), where x(22)=x(21)−x.
P(1)'s share of y is (y(11), y(12)), where y(12)=y(31)−y,
P(2)'s share of y is (y(21), y(22)), where y(22)=y(11)−y; and
P(3)'s share of y is (y(31), y(32)), where y(32)=x(21)−y.

Then, P(1)'s share of x+y is (x(11)+y(11), x(12)+y(12)),
P(2)'s share of x+y is (x(21)+y(21), x(22)+y(22)), and
P(3)'s share of x+y is (x(31)+y(31), x(32)+y(32)).

x+y can be reconstructed from the pair of (x(11)+y(11), x(12)+y(12)), and (x(21)+y(21), x(22)+y(22)), as follows:

$$x + y = x(11) + y(11) - (x(22) + y(22))$$
$$= x(11) + y(11) - (x(11) - x + y(11) - y).$$

Given [x] and y where y is known to every party, we assume that n parties P(1), ..., and P(n) are able to compute by MPC [z]=[x+y], without communication, with semi-honest security. This procedure is denoted by [z]=[x]+y or [z]=y+[x].

The following describes an example of the MPC addition. Suppose x is secretly shared by the above (2,3)-secret sharing scheme and y is known to all parties. More specifically,
P(1)'s share of x is (x(11), x(12)), where x(12)=x(31)−x;
P(2)'s share of x is (x(21), x(22)), where x(22)=x(11)−x; and
P(3)'s share of x is (x(31), x(32)), where x(32)=x(21)−x.
Then,
P(1)'s share of x+y is (x(11), x(12)−y),
P(2)'s share of x+y is (x(21), x(22)−y), and
P(3)'s share of x+y is (x(31), x(32)−y).
x+y can be reconstructed from the pair of (x(11), x(12)−y) and (x(21),x(22)−y), as follows:

$$x+y=x(11)-(x(22)-y)=x(11)-((x(11)-x)-y).$$

Given [x] and y where y is known to every party, we assume that P(1), ..., and P(n) are able to MPC [z]=[xy] without communication with semi-honest security. This procedure is denoted by [z]=[x]y or [z]=y[x].

The following describes an example of this MPC multiplication.

Suppose x is secretly shared by the above (2,3)-secret sharing scheme and y is known to all parties. More specifically,
P(1)'s share of x is (x(11), x(12)), where x(12)=x(31)/x;
P(2)'s share of x is (x(21), x(22)), where x(22)=x(11)/x; and
P(3)'s share of x is (x(31), x(32)), where x(32)=x(21)/x.
Then,
P(1)'s share of xy is (x(11)y, x(12)),
P(2)'s share of xy is (x(21)y, x(22)), and
P(3)'s share of xy is (x(31)y, x(32)).
xy can be reconstructed from the pair of (x(11)y, x(12)) and (x(21)y, x(22)), as follows:

$$xy=(x(11)y)/x(22)=(x(11)y)/(x(11)/x).$$

Given [x] and [y], we assume that P(1), ..., and P(n) each are able to MPC [z]=[xy], with some communication, with semi-honest security. This procedure is denoted by [z]=[x]*[y].

An example of MPC multiplication is as follows. Suppose x and y are secretly shared by the above (2,3)-secret sharing scheme.
More specifically,
P(1)'s share of x is (x(11), x(12)),
P(2)'s share of x is (x(21), x(22)),
P(3)'s share of x is (x(31), x(32)),
P(1)'s share of y is (y(11), y(12)),
P(2)'s share of y is (y(21), y(22)), and
P(3)'s share of y is (y(31), y(32)).

Suppose that there exists a set of r(1), r(2), and r(3) randomly selected and satisfying: r(1)+r(2)+r(3)=0. Suppose also that P(1) has r(1), P(2) has r(2), and P(3) has r(3).
P(1) computes t(1)=(−x(11)y(11)+x(12)y(12)+r(1))/3 and sends t(1) to P(2).
P(2) computes t(2)=(−x(21)y(21)+x(22)y(22)+r(2))/3 and sends t(2) to P(3).
P(3) computes t(3)=(−x(31)y(31)+x(32)y(32)+r(3))/3 and sends t(3) to P(1).
P(1)'s share of xy is (z1=t(3)−t(1), c1=−2t(3)−t(1)),
P(2)'s share of xy is (z2=t(1)−t(2), c2=−2t(1)−t(2)), and
P(3)'s share of xy is (z3=t(2)−t(3), c3=−2t(2)−t(3)).

$$x(12)y(12)=(x(31)-x)(y(31)-y)=x(31)y(31)-x(31)y-y(31)x+xy.$$

$$x(22)y(22)=(x(11)-x)(y(11)-y)=x(11)y(11)-x(11)y-y(11)x+xy.$$

$$x(32)y(32)=(x(21)-x)(y(21)-y)=x(21)y(21)-x(21)y-y(21)x+xy.$$

Accordingly, $$\begin{aligned}3(t(1)+t(2)+t(3)) &= -x(11)y(11)+x(12)y(12)+r(1)- \\ &\quad x(21)y(21)+x(22)y(22)+r(2)- \\ &\quad x(31)y(31)+x(32)y(32)+r(3) \\ &= x(12)y(12)+x(22)y(22)+x(32)y(32)- \\ &\quad x(11)y(11)-x(21)y(21)-x(31)y(31) \\ &= 3xy-x(y(11)+y(21)+y(31))- \\ &\quad y(x(11)+x(21)+x(31)) \\ &= 3xy.\end{aligned}$$

It is assumed that n parties P(1) to P(n) each are able to share random elements of R as many as they want, without revealing them to anyone, without communication.

An example of the random elements shared by three parties is as follows. Suppose random seeds S(1), S(2) and S(3) are already shared as follows:
P(1) has S(3) and S(1),
P(2) has S(1) and S(2), and
P(3) has S(2) and S(3).

Suppose HashR( ) is a cryptographic hash function that outputs an element of R.

P(1) generates its share of i-th random element r(li) as HashR(S(3),i)−HashR(S(1),i).

P(2) generates its share of i-th random element r(2i) as HashR(S(1),i)−HashR(S(2),i).

P(3) generates its share of i-th random element r(3i) as HashR(S(2),i)−HashR(S(3),i).

FIG. 2 is a flowchart illustrating an operation according to example embodiments of the present invention. FIG. 2 illustrates an operation of circuit validation performed by each of parties that share a secret based on the (2,3) secret sharing scheme according to the example embodiments.

Referring to FIG. 2, step S1 (first process), in each of the parties, prepares a plurality of verified multiplication triples and feeds at least a multiplication triple to step S2, when required.

Step S2 (second process), in each of the parties, consumes a randomly selected multiplication triple generated by step S1.

Step S1 (first process), in each of the parties, may perform shuffling of the generated multiplication triples, in at least one of shuffle (permutation) in a sequence in which the triples in a sequence are shuffled on per a triplet basis and shuffle of sequences in which sequences are shuffled on a per sequence basis.

Alternatively, step S1 (first process), in each of the parties, may use or include a first buffer to provide a multiplication triple randomly selected from entirety thereof when required, and to be refilled from a second buffer in order.

FIG. 3 is a diagram illustration an example of an arrangement of one of the parties according to one of example embodiments. Since the parties (n parties, where n=3) each have the same arrangement, the arrangement of one party is illustrated in FIG. 3. Referring to FIG. 3, the party 100 includes a processor with a memory and a communication interface, all of which are not shown in FIG. 3, to execute a multiplication triples generation process 102, a circuit computation process 104, and a circuit validation process 106.

The multiplication triples generation process 102 generates verified N multiplication triples.

The circuit computation process 104 of the parties, given shares on inputs wires of gates, compute a functionality f on input wires of the gates. Results on an output wire of the gates may be defined as shares of the parties.

The circuit validation process 106 validates that multiparty computation was carried out correctly.

The example embodiments will be described more in detail with reference to drawings.

<Triple Verification>

The following describes verification of the multiplication triples. Regarding the verification, reference may be made, for example, to NPLS.

Suppose that B numbers (tuples) of multiplication triples: ([a(1)], [b(1)], [c(1)]), . . . , and ([a(B)], [b(B)], [c(B)]) are given, where [a(i)], [b(i)], and [c(i)] (i=1, . . . , B) denote that a(i), b(i), and c(i) (i=1, . . . , B) are respectively secretly shared among parties. Assuming that, for each i-th multiplication triple, if a(i)*b(i)=c(i) does not hold, it is detected with a certain mildly high probability. Then, the following test can detect with a higher probability, if ([a(i)], [b(i)], [c(i)]) does not satisfy the relation [a(i)]*[b(i)]=[c(i)].

After the test, a(1), b(1), and c(1) will remain secretly shared unless other shares: ([a(2)], [b(2)], [c(2)]), . . . , and ([a(B)], [b(B)], [c(B)]) are opened.

For i=2, . . . , B, each of the parties locally computes and opens [a(i)+a(1)] and [b(i)+b(1)], as r(i) and s(i), respectively. Here, "open" means that each set of majority parties opens them.

Then, based on what each party has learned for r(i) and s(i) (i=2, . . . , B), each party computes its share of $$[c'(i)] = r(i)*s(i) - r(i)*[b(i)] - s(i)*[a(i)] + [c(i)]$$
$$= ([a(i) + a(1)])*([b(i) + b(1)]) -$$
$$([a(i) + a(1)])*[b(i)] - ([b(i) + b(1)])*$$
$$[a(i)] + [c(i)]$$
$$= [a(1)]*[b(1)] - [a(i)]*[b(i)] + [c(i)],$$

and checks by opening:

$$[c(i)-c(i)]=[c(i)]-[c(i)].$$

This equation holds, when a(i)b(i)=c(i) holds either for all i or for no i. Hence, a probability to pass this test is close to products of mildly high probability.

The following describes a protocol according to the example embodiment. First, secure generation of multiplication triples will be described with reference to FIG. 4.

<Generating Triples>

The operation of generating N number of multiplication triples by the multiplication triples generation process 102 of the parties will be described with reference to FIG. 4.

<Step S101>

The number N of triples to be generated is input. Auxiliary parameters B, C, X, and L, such that N=(X−C)*L are input, where X is a size of each subarray, C is the number of triples opened in each subarray, B is the number of buckets, and L is the number of subarrays in one bucket.

<Generate Sharing of M Random Values (Step S102)>

The multiplication triples generation process 102 of each of the parties generates sharing of 2M random values, where 2M=2(N+C*L)*(B−1)+2N=2(N+C*L)*B, denoted by the shares that the parties receive [([a(i)], [b(i)])] (i=1, . . . , M). Parties each can generate a sharing of a random secret value v known to none of them.

<Generate Multiplication Triples (Step S103)>

The multiplication triples generation process 102 of each of the parties runs a semi-honest multiplication protocol to compute: [c(i)]=[a(i)]*[b(i)]. Denote D=[([ai]; [bi]; [ci])] (i=1, . . . , M=(N+C*L)*B). [c(i)] is a result of the protocol and is not necessarily correct.

<Cut and Bucket (Step S104)>

The multiplication triples generation process 102 of each of the parties performs a first verification that the triples were generated correctly, by opening some of triples (C triples) and then randomly divides the remainder into a plurality of buckets.

(a) The multiplication triples generation process 102 of each of the parties splits D with (N+C*L)*(B−1)+N triples into vectors D'(1), . . . , and D'(B), such that D'(1) contains N triples and each D'(j) for j=2, . . . , B contains (N+C*L) triples, as illustrated in FIG. 5. Here, each party splits only its own share of D, on the assumption that other parties do the same.

(b) For k=2 to B, the multiplication triples generation process 102 of each of the parties splits D'(k) into L subarrays of equal size X, where L*(X−C)=N. L subarrays of equal size X are D"(k, 1), . . . , and D"(k, L), as illustrated in FIG. 6. Here again, each party splits only its own share. In FIG. 6, C triples in each of D"(k, 1), . . . , and D"(k, L) (k=1, . . . , B) are triples to be opened.

(c) For k=2, . . . , B, and j=1, . . . , L, the multiplication triples generation process 102 of each of the parties jointly and randomly permutes the order of triples in D"(k, j). Here, the party each randomly permute only share thereof. However, by using the randomness that all the parties agree, all the permutations are coordinated to be the same.

(d) For each k=2, . . . , B, the multiplication triples generation process 102 of each of the parties jointly permutes the order of L subarrays among D"(k, 1), . . . , and D"(k, L).

(e) For k=2, . . . , B, and j=1, . . . , L, the multiplication triples generation process 102 of each of majority set of parties opens each of the first C triples, in D"(k, j), as illustrated in FIG. 6, and checks that $a(i)b(i)=c(i)$ holds, where an index i is that for a chosen triple.

As described above, at least one party in each of the majority set of parties reconstructs $a(i)$, $b(i)$, and $c(i)$, and this party can check the equation: $a(i)b(i)=c(i)$.

If no majority set of parties rejects it, all parties remove them from D"(k, j).

If any one of majority set of parties rejects any check, they sends "Abort" to the other parties and output "Abort" as the protocol.

(f) The remaining triples are divided into N sets of triples E'(1), . . . , and E'(N), each of size B (including B triples), as illustrated in FIG. 7.

<Check Buckets (Step 105)>

It is assumed that a vector d is of length N. For i=1, . . . , N, in E'(i), among B triples, a first triple ([a(1)], [b(1)], [c(1)]) is verified using remaining B−1 triples ([a(j)], [b(j)], [c(j)]) (j=2, . . . , B) by the triple verification method described above. The parties set ([a(1)], [b(1)], [c(1)]) in i-th entry d(i) of a vector d of length N, as illustrated in FIG. 7.

<Step S106>

Now, N multiplication triples are prepared in the vector d, in each of the parties. The parties output N multiplication triples.

Whenever additional N triples are necessary, one can obtain by running the above protocol (step S101 to S106).

<Circuit Computation>

The operation of the circuit computation process 104 of each of the parties will be described with reference to FIG. 8.

Circuit and shares of input to a circuit are input (step S201). The circuit includes gates and wires. Each gate is either of multiplication or addition. Each multiplication gate and addition gate has two input wires and one output wire.

As illustrated in FIG. 9, each input wire can be either input to the circuit or an output of some gates. Each output wire can be either output of the circuit, input to other gates, or both. Each of input and output wires is associated to a secret shared value. Hence, each gate is given secret shared inputs (e.g., [x], [y], . . . ) and generates a secret shared output (e.g., [z], . . . ).

At the beginning of a computation phase in the circuit, an input to the circuit is given, that is a set of secret shared values, each of which is an input to some gate (step S202).

For such each gate, with the secret shared values of both input wires already generated, the secret value of its output wire can be generated by semi-honest secure multiparty computation (secure multiparty computation for semi-honest adversaries) (step S203).

Repeating the procedure of step S203 for all such gates whose secret shared values for the input wires are prepared (step S204), the secret values of all the output of the circuit can be generated (step S205).

<Circuit Validation>

The operation of the circuit validation process 106 of each of the parties will be described with reference to FIG. 10.

The circuit validation process 106 of each of the parties prepares two buffer vectors V and V' of each N triples. The circuit validation process 106 fills two buffer vectors V and V' with N triples generated by the multiplication triples generation process 102, where $N=(X-C)*L$ (step S301).

The circuit validation process 106 of each of the parties runs the multiplication triples generation process 102 as many times as necessary to generate enough number of triples to fill the buffer vectors V and V'.

The circuit validation process 106 of each of the parties divides buffer vectors V and V' respectively into L subarrays $V(1), \ldots, V(L)$, and $V'(1), \ldots, V'(L)$, with each size thereof being $X'=X-C$, as illustrated in FIG. 11 (step S302).

The result of the circuit computation by the circuit computation process 104 can be viewed, as a sequence of gates, each of which includes secret shared inputs and a secret shared output.

When a gate is of addition, no party can be effectively malicious to other parties, in the sense that the gate can manipulate data of other parties, as it is non interactive protocol.

Party can behave effectively malicious if a gate is of multiplication. Hence, it is enough to verify validity of a sequence of each of multiplication gates only. Here, the sequence of multiplication gates is called Q.

Let the number of the sequence of multiplication gates is M' and $M'=X'L'+K$ for some L', where $X'=X-C$ and $K<X'$.

Let Q be divided, in order, into $Q(1), \ldots, Q(L')$, and $Q(L'+1)$, where $Q(1), \ldots, Q(L')$ each are of a size X' and $Q(L'+1)$ is of a size K, as illustrated in FIG. 11 (step S303).

For i=1 to L'+1 (step S304), do the following steps S305 to S308.

<Step 305>

The circuit validation process 106 of each of the parties randomly chooses a subarray from the buffer vector V'. This subarray can be randomly shuffled. Let us call this subarray S(i).

<Steps S306 to S307>

For j=1 to X', the circuit validation process 106 of each of the parties verifies j-th tuple of Q(i) (j-th triple of a gate in the circuit), by the j-th tuple(multiplication triple) of S(i). When i=L'+1, j runs only to K instead of X'. As an example, assuming that ([x], [y]) are shares of the input wires to the j-th triples and [z] is share of the output wire of the j-th f Q(i), the parties perform triple verification on ([x], [y], [z]) and ([a(j)], [b(j)], [c(j)]) to verify ([x], [y], [z]), that is, to validate the computation of the relevant gate(s) was carried out correctly. If a party did not output accept in every execution, the party sends Abort to the other parties.

<Step S308>

The circuit validation process 106 of each of the parties replaces S(i) in V' with V(i) and deletes V(i) in V.

<Steps S309-S310>

Once the above process is finished, for all j=L'+2 to M', the circuit validation process 106 of each of the parties renames V(j) to V(j−L'+1). Here, M' is such that V(M'+1) is empty.

Note that the above rename steps (S309-S310) make empty V(j) for some j, unless V(j) is refilled.

Through the above process, all subarrays in the buffer vector V may be deleted. Then, this can be refilled by the multiplication triples generation process 102. Triples in the buffer vector V are consumed and refilled only by a chunk with a preset large size.

Assume that M/2 triples are chosen from LK+M triples and are verified as described above. For appropriate values of G and T, a probability of not detecting a non correctly generated triple in the verification is less than G, when more than 1/T of triples are not correctly generated.

In the above described embodiments, since B-1 triples are used to verify one triple, a probability that the output of the multiplication triple generation process 102 includes more than $(1/T)^B$ non-correctly generated triples is G, where ^ is a power operator.

Suppose G chosen is a so small probability that a user of the system can accept it as negligible by increasing T, which is always possible. Then, the user is able to decrease an expected number of non-correctly generated triples, when such a malicious generation of triples is not detected, by increasing B.

As the triples stored in the buffer vector V' is randomly selected after the triple of a gate in a circuit is generated, the malicious party cannot deceive in computing this gate, without risking to be detected, even if very small portion of triples in the buffer vector V' are non-correctly generated.

As the buffer vector V' is always refilled from the buffer vector V, after its element (V'(i): randomly selected and shuffled) is used for verification, the size of the ensemble from which a triple is selected remains to be the same and large enough. This keeps capability to detect malicious gate computation high. Furthermore, this process requires no memory to remember places of consumed triples in the buffer vector V', as they are refilled instantly.

Multiplication triples in the buffer vector V are consumed and refilled only by a chunk with a preset size (large size). The consumed triples do not scatter randomly in the buffer vector V, but they are consumed in order, with use of a position of the last consumed triple, thus making the buffer management simple.

Shuffle operations are executed in two ways. One is a fine shuffle of a small sequence. The sequence can be small enough so that it can be on a cache for fast operation.

The other is a coarse shuffle of a large sequence where the unit to be shuffled is the above sequence. As only a data is moved in a chunk of a certain size, the cost of operation for each triple is small.

Combination of these two shuffles does not generate complete shuffle as a total, but it is enough for security with which the example embodiments are concerned. Therefore, high enough security is obtained with fast operation.

The example embodiments enable parties to compute any function of their inputs in distributed way while each party is unable to learn other party's input.

When a party does not follow the protocol, the other parties can detect it. Such a computation method can be applied to service where confidential data is handled so that malwares in a machine or operator of a machine might try to steal the data.

The party above described may be implemented on a computer system as illustrated in FIG. 12, for example. Referring to FIG. 12, a computer apparatus 110 includes a processor (Central Processing Unit) 112, a memory 114 including, for example, a semiconductor memory (for example, Random Access Memory (RAM), Read Only Memory (ROM), Electrically Erasable and Programmable ROM (EEPROM), and/or a storage device including at least one of Hard Disk Drive (HDD), Compact Disc (CD), Digital Versatile Disc (DVD) and so forth, a display device 116, and a communication interface 118. The communication interface 118 (such as a network interface controller (NIC)) may well be configured to communicate with other parties. A program for executing the process of the party in FIG. 2 is stored in a memory 114 and the processor 112 reads the program from the memory to execute the program to realize the party that performs multi-party computing.

Each disclosure of the above listed Non-Patent Literatures 1 to 5 is incorporated by reference into the present document. Modifications and adjustments of embodiments and examples are possible within bounds of the entire disclosure (including the scope and range of each of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to technological concepts and the entire disclosure including the scope of the claims.

The invention claimed is:

1. A method for multiparty computation wherein a plurality of parties each compute a preset function without revealing inputs thereof to others, the method comprising:
   each of the parties performing a validation step to validate that computation of the function is carried out correctly, wherein
   the validation step includes:
   a first step that prepares a plurality of verified multiplication triples and feeds at least a multiplication triple to a second step; and
   the second step consumes a randomly selected multiplication triple generated by the first step,
   wherein the first step performs shuffling of the generated multiplication triples, in at least one of shuffle in a sequence and shuffle of sequences,
   wherein the first step uses a first buffer to provide a multiplication triple that is randomly selected from entirety thereof, and to be refilled from a second buffer in order, and
   wherein the first buffer is refilled from the second buffer, instantly after an element randomly selected and shuffled is used for verification, keeping a size of the first buffer from which a triple is selected to be the same.

2. The method according to claim 1, wherein the second step randomly selects the multiplication triples stored in the first buffer after a triple of a gate of a circuit corresponding to the function is generated.

3. The method according to claim 1, wherein the multiplication triples in the second buffer are consumed and refilled by a chunk with a preset size.

4. The method according to claim 1, wherein the first step verifies one multiplication triple using a plurality of multiplication triples.

5. A multiparty computation apparatus comprising:
   a processor; and
   a memory storing a program executable by the processor, wherein the processor is configured to execute a circuit validation process to validate that multiparty computation of a preset function is carried out correctly, wherein
   the circuit validation process includes:
   a first process that prepares a plurality of verified multiplication triples and feeds at least a multiplication triple to a second process; and
   the second process consumes a randomly selected multiplication triple generated by the first process, wherein the first process performs shuffling of the generated multiplication triples, in at least one of shuffle in a sequence and shuffle of sequences, wherein the first process uses a first buffer to provide a multiplication triple that is randomly selected from entirety thereof, and to be refilled from a second buffer in order, and wherein the second process refills the first buffer from the second buffer, instantly after an element randomly selected and shuffled is used for verification, to keep a size of the first buffer from which a triple is selected to be the same.

6. The apparatus according to claim 5, wherein the second process randomly select the multiplication triples stored in the first buffer after a triple of a gate of a circuit corresponding to the function is generated.

7. The apparatus according to claim 5, wherein the second process consumes and refills triples in the second buffer by a chunk with a preset size.

8. The apparatus according to claim 5, wherein the first process verifies one multiplication triple using a plurality of multiplication triples.

9. A non-transitory computer readable medium storing thereon a program that when executed by a computer, causes the computer to execute circuit validation process to validate that multiparty computation of a preset function is carried out correctly, wherein the circuit validation process comprises:

a first process that prepares a plurality of verified multiplication triples and feeds at least a multiplication triple to a second process; and the second process consumes a randomly selected multiplication triple generated by the first process, wherein the first process performs shuffling of the generated multiplication triples, in at least one of shuffle in a sequence and shuffle of sequences, wherein the first process uses a first buffer to provide a multiplication triple that is randomly selected from entirety thereof, and to be refilled from a second buffer in order, and wherein the second process refills the first buffer from the second buffer, instantly after an element randomly selected and shuffled is used for verification, to keep a size of the first buffer from which a triple is selected to be the same.

\* \* \* \* \*